US012779396B2

(12) United States Patent
Luo et al.

(10) Patent No.: US 12,779,396 B2
(45) Date of Patent: Nov. 3, 2026

(54) DEVICE AND METHOD FOR CONTROLLING AMMONIA ESCAPE IN AMMONIA-BASED DECARBONIZATION SYSTEM

(71) Applicant: Jiangnan Environmental Protection Group Inc., Grand Cayman (KY)

(72) Inventors: Jing Luo, Nanjing (CN); Jun Zhang, Nanjing (CN); Lifang Qi, Beijing (CN); Jinyong Wang, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 614 days.

(21) Appl. No.: 18/196,496

(22) Filed: May 12, 2023

(65) Prior Publication Data

US 2023/0405519 A1 Dec. 21, 2023

(30) Foreign Application Priority Data

May 19, 2022 (CN) ......................... 202210552210.6

(51) Int. Cl.
*B01D 53/58* (2006.01)
*B01D 53/14* (2006.01)
(Continued)

(52) U.S. Cl.
CPC ......... *B01D 53/58* (2013.01); *B01D 53/1406* (2013.01); *B01D 53/1425* (2013.01);
(Continued)

(58) Field of Classification Search
None
See application file for complete search history.

(56) References Cited

U.S. PATENT DOCUMENTS

| | | | |
|---|---|---|---|
| 2,810,627 | A | 10/1957 | Johnstone et al. |
| 3,752,877 | A | 8/1973 | Beavon |

(Continued)

FOREIGN PATENT DOCUMENTS

| | | | |
|---|---|---|---|
| CN | 1280032 | A | 1/2001 |
| CN | 201880482 | U | 6/2001 |

(Continued)

OTHER PUBLICATIONS

CN114146549A_ENG (Espacenet machine translation of Zhu) (Year: 2022).*

(Continued)

*Primary Examiner* — Gabriel E Gitman
(74) *Attorney, Agent, or Firm* — Weiss & Arons LLP

(57) ABSTRACT

Apparatus and methods for controlling ammonia escape in an ammonia-based decarbonization system, wherein ammonia may be used as the desulfurization and decarbonization agent, the gas may first enter the desulfurization device for desulfurization to produce ammonium sulfate fertilizer, and the desulfurized gas may enter the decarbonization device to remove carbon dioxide in the gas, and may produce ammonium bicarbonate fertilizer. The decarbonized gas may include free ammonia, and the free ammonia in the gas may be absorbed with the acidic ammonium sulfate solution and acidic water washing liquid of ammonia-based desulfurization.

10 Claims, 3 Drawing Sheets

(51) Int. Cl.

| | |
|---|---|
| ***B01D 53/18*** | (2006.01) |
| ***B01D 53/50*** | (2006.01) |
| ***B01D 53/62*** | (2006.01) |
| ***B01D 53/75*** | (2006.01) |
| ***B01D 53/78*** | (2006.01) |

(52) U.S. Cl.

CPC ..... *B01D 53/1475* (2013.01); *B01D 53/1481* (2013.01); *B01D 53/1493* (2013.01); *B01D 53/185* (2013.01); *B01D 53/501* (2013.01); *B01D 53/502* (2013.01); *B01D 53/504* (2013.01); *B01D 53/62* (2013.01); *B01D 53/75* (2013.01); *B01D 53/78* (2013.01); *B01D 53/1418* (2013.01); *B01D 53/50* (2013.01); *B01D 2251/206* (2013.01); *B01D 2251/2062* (2013.01); *B01D 2252/102* (2013.01); *B01D 2257/302* (2013.01); *B01D 2257/406* (2013.01); *B01D 2257/504* (2013.01)

(56) References Cited

U.S. PATENT DOCUMENTS

| | | | |
|---|---|---|---|
| 3,983,217 | A | 9/1976 | Muraki et al. |
| 4,250,160 | A | 2/1981 | Eakman |
| 4,294,590 | A | 10/1981 | Linde et al. |
| 4,324,776 | A | 4/1982 | Kim |
| 4,378,977 | A | 4/1983 | Linde et al. |
| 4,552,747 | A | 11/1985 | Goar |
| 4,690,807 | A | 9/1987 | Saleem |
| 5,019,361 | A | 5/1991 | Hakka |
| 5,106,607 | A | 4/1992 | Chopin et al. |
| 5,362,458 | A | 11/1994 | Saleem et al. |
| 5,632,967 | A | 5/1997 | Nasato |
| 6,063,352 | A | 5/2000 | Risse et al. |
| 6,066,304 | A | 5/2000 | Freetly et al. |
| 6,139,807 | A | 10/2000 | Risse et al. |
| 6,221,325 | B1 | 4/2001 | Brown et al. |
| 6,444,185 | B1 | 9/2002 | Nougayrede et al. |
| 6,508,998 | B1 | 1/2003 | Nasato |
| 6,569,398 | B2 | 5/2003 | Fenderson |
| 6,616,908 | B2 | 9/2003 | Watson et al. |
| 6,776,974 | B1 | 8/2004 | Burmaster et al. |
| 6,991,771 | B2 | 1/2006 | Duncan et al. |
| 7,351,392 | B2 | 4/2008 | Chen et al. |
| 7,635,408 | B2 | 12/2009 | Mak et al. |
| 7,648,692 | B2 | 1/2010 | Chow et al. |
| 7,754,471 | B2 | 7/2010 | Chen et al. |
| 7,879,135 | B2 | 2/2011 | Ravikumar et al. |
| 7,910,077 | B2 | 3/2011 | Chow et al. |
| 8,178,070 | B2 | 5/2012 | Wong et al. |
| 8,206,669 | B2 | 6/2012 | Schaffer et al. |
| 8,361,432 | B2 | 1/2013 | Parekh et al. |
| 8,444,943 | B2 | 5/2013 | Lamar |
| 8,545,793 | B2 | 10/2013 | Thielert |
| 8,871,176 | B2 | 10/2014 | Liu et al. |
| 9,370,745 | B2 | 6/2016 | Xu et al. |
| 2003/0175190 | A1 | 9/2003 | Duncan et al. |
| 2007/0248518 | A1 | 10/2007 | Jung et al. |
| 2009/0004070 | A1 | 1/2009 | Chow et al. |
| 2010/0089110 | A1 * | 4/2010 | Duncan ..................... C01C 1/24 95/200 |
| 2011/0195008 | A1 | 8/2011 | Menzel et al. |
| 2011/0243822 | A1 | 10/2011 | Mortson |
| 2015/0352489 | A1 | 12/2015 | Luo et al. |
| 2021/0197117 | A1 * | 7/2021 | Luo .................... B01D 53/1481 |

FOREIGN PATENT DOCUMENTS

| | | | |
|---|---|---|---|
| CN | 1377722 | A | 11/2002 |
| CN | 1178735 | C | 4/2003 |
| CN | 1408464 | A | 4/2003 |
| CN | 1164480 | C | 9/2004 |
| CN | 2640584 | Y | 9/2004 |
| CN | 2640585 | Y | 9/2004 |
| CN | 2668235 | Y | 1/2005 |
| CN | 1617831 | A | 5/2005 |
| CN | 2746971 | Y | 12/2005 |
| CN | 2746972 | Y | 12/2005 |
| CN | 2746973 | Y | 12/2005 |
| CN | 2754711 | Y | 2/2006 |
| CN | 1251965 | C | 4/2006 |
| CN | 2772609 | Y | 4/2006 |
| CN | 2778373 | Y | 5/2006 |
| CN | 2799059 | Y | 7/2006 |
| CN | 2799060 | Y | 7/2006 |
| CN | 1283346 | C | 11/2006 |
| CN | 1321723 | C | 6/2007 |
| CN | 101085410 | A | 12/2007 |
| CN | 201030298 | Y | 3/2008 |
| CN | 201052456 | Y | 4/2008 |
| CN | 100395006 | C | 6/2008 |
| CN | 201109711 | Y | 9/2008 |
| CN | 100428979 | C | 10/2008 |
| CN | 201129965 | Y | 10/2008 |
| CN | 201132102 | Y | 10/2008 |
| CN | 101352642 | A | 1/2009 |
| CN | 201179415 | Y | 1/2009 |
| CN | 100460045 | C | 2/2009 |
| CN | 100475313 | C | 4/2009 |
| CN | 101422693 | A | 5/2009 |
| CN | 201231130 | Y | 5/2009 |
| CN | 101524620 | | 9/2009 |
| CN | 201320447 | Y | 10/2009 |
| CN | 201333376 | Y | 10/2009 |
| CN | 101575103 | A | 11/2009 |
| CN | 101585511 | A | 11/2009 |
| CN | 201380037 | Y | 1/2010 |
| CN | 201380038 | Y | 1/2010 |
| CN | 201380039 | Y | 1/2010 |
| CN | 201380040 | Y | 1/2010 |
| CN | 100588608 | C | 2/2010 |
| CN | 101642629 | A | 2/2010 |
| CN | 201423237 | Y | 3/2010 |
| CN | 101274750 | B | 6/2010 |
| CN | 101745303 | A | 6/2010 |
| CN | 201492952 | U | 6/2010 |
| CN | 201529487 | U | 7/2010 |
| CN | 201529488 | U | 7/2010 |
| CN | 201537456 | U | 8/2010 |
| CN | 101274196 | B | 12/2010 |
| CN | 101182926 | B | 1/2011 |
| CN | 101519192 | B | 2/2011 |
| CN | 101579600 | B | 4/2011 |
| CN | 102000490 | A | 4/2011 |
| CN | 102012034 | A | 4/2011 |
| CN | 101456541 | B | 5/2011 |
| CN | 101576261 | B | 5/2011 |
| CN | 101579602 | B | 5/2011 |
| CN | 102061206 | A | 5/2011 |
| CN | 101274204 | B | 6/2011 |
| CN | 101670231 | B | 8/2011 |
| CN | 201912884 | U | 8/2011 |
| CN | 201912885 | U | 8/2011 |
| CN | 201944861 | U | 8/2011 |
| CN | 201949808 | U | 8/2011 |
| CN | 102205202 | A | 10/2011 |
| CN | 102380305 | A | 3/2012 |
| CN | 102381685 | A | 3/2012 |
| CN | 102381686 | A | 3/2012 |
| CN | 102423597 | A | 4/2012 |
| CN | 101791517 | B | 5/2012 |
| CN | 102451604 | A | 5/2012 |
| CN | 101456540 | B | 7/2012 |
| CN | 101574614 | B | 7/2012 |
| CN | 101637685 | B | 7/2012 |
| CN | 102631827 | A | 8/2012 |
| CN | 202460375 | U | 10/2012 |
| CN | 202460420 | U | 10/2012 |
| CN | 202460438 | U | 10/2012 |
| CN | 101530727 | B | 11/2012 |
| CN | 101600489 | B | 11/2012 |
| CN | 101955828 | B | 11/2012 |

(56) References Cited

FOREIGN PATENT DOCUMENTS

| | | | | | |
|---|---|---|---|---|---|
| CN | 102211762 | B | | 11/2012 | |
| CN | 101972592 | B | | 12/2012 | |
| CN | 202538627 | U | | 12/2012 | |
| CN | 101934191 | B | | 1/2013 | |
| CN | 102049186 | B | | 1/2013 | |
| CN | 202725003 | U | | 2/2013 | |
| CN | 202751942 | U | | 2/2013 | |
| CN | 202754802 | U | | 2/2013 | |
| CN | 202829575 | U | | 3/2013 | |
| CN | 101418246 | B | | 4/2013 | |
| CN | 202912691 | U | | 5/2013 | |
| CN | 202924730 | U | | 5/2013 | |
| CN | 202953829 | U | | 5/2013 | |
| CN | 102381687 | B | | 8/2013 | |
| CN | 203159221 | U | | 8/2013 | |
| CN | 203264545 | U | | 11/2013 | |
| CN | 203291675 | U | | 11/2013 | |
| CN | 102489140 | B | | 12/2013 | |
| CN | 103418223 | A | | 12/2013 | |
| CN | 203329558 | U | | 12/2013 | |
| CN | 203612955 | U | | 5/2014 | |
| CN | 102942162 | B | | 8/2014 | |
| CN | 203781842 | U | | 8/2014 | |
| CN | 102910593 | B | | 9/2014 | |
| CN | 102847431 | B | | 10/2014 | |
| CN | 103204477 | B | | 10/2014 | |
| CN | 103446859 | B | | 10/2014 | |
| CN | 104138713 | A | | 11/2014 | |
| CN | 103301732 | B | | 1/2015 | |
| CN | 103041679 | B | | 2/2015 | |
| CN | 103301736 | B | | 2/2015 | |
| CN | 104368231 | A | | 2/2015 | |
| CN | 204134465 | U | | 2/2015 | |
| CN | 204151066 | U | | 2/2015 | |
| CN | 102895870 | B | | 3/2015 | |
| CN | 102923670 | B | | 3/2015 | |
| CN | 204198421 | U | | 3/2015 | |
| CN | 103223292 | B | | 4/2015 | |
| CN | 104555939 | A | | 4/2015 | |
| CN | 204233957 | U | | 4/2015 | |
| CN | 103112831 | B | | 5/2015 | |
| CN | 204352660 | U | | 5/2015 | |
| CN | 103301705 | B | | 8/2015 | |
| CN | 103482583 | B | | 9/2015 | |
| CN | 104923046 | A | | 9/2015 | |
| CN | 104927894 | A | | 9/2015 | |
| CN | 104941423 | A | | 9/2015 | |
| CN | 104946296 | A | | 9/2015 | |
| CN | 103463949 | B | | 12/2015 | |
| CN | 105110819 | A | | 12/2015 | |
| CN | 105126573 | A | | 12/2015 | |
| CN | 104353258 | B | | 1/2016 | |
| CN | 104249995 | B | | 4/2016 | |
| CN | 205235588 | U | | 5/2016 | |
| CN | 205245200 | U | | 5/2016 | |
| CN | 205252720 | U | | 5/2016 | |
| CN | 205252721 | U | | 5/2016 | |
| CN | 205252722 | U | | 5/2016 | |
| CN | 205262780 | U | | 5/2016 | |
| CN | 103822217 | B | | 6/2016 | |
| CN | 105757688 | A | | 7/2016 | |
| CN | 104555940 | B | | 8/2016 | |
| CN | 105841168 | A | | 8/2016 | |
| CN | 104524948 | B | | 9/2016 | |
| CN | 205549846 | U | | 9/2016 | |
| CN | 205562498 | U | | 9/2016 | |
| CN | 103521060 | B | | 1/2017 | |
| CN | 103939918 | B | | 1/2017 | |
| CN | 104208992 | B | | 2/2017 | |
| CN | 104258713 | B | | 2/2017 | |
| CN | 104528659 | B | | 4/2017 | |
| CN | 113262625 | A | | 8/2021 | |
| CN | 114146549 | A | * | 3/2022 | ............. B01D 53/75 |
| DE | 3733319 | A1 | | 9/1989 | |
| EP | 165609 | B1 | | 6/1985 | |
| EP | 212523 | A2 | | 3/1987 | |
| JP | S47-043737 | | | 11/1972 | |
| TW | 497985 | | | 8/2002 | |
| WO | WO200507505 | A1 | | 8/2005 | |
| WO | WO2005113429 | A1 | | 12/2005 | |
| WO | WO2006113935 | A2 | | 10/2006 | |
| WO | WO-2010036436 | A1 | * | 4/2010 | ............. H01S 3/095 |
| WO | WO2012152919 | A1 | | 11/2012 | |

OTHER PUBLICATIONS

Google Patents English translation of CN1283346C.
Google Patents English translation of CN2640585Y.
Google Patents English translation of CN2772609Y.
Google Patents English translation of CN100428979C.
Google Patents English translation of CN201912885U.
Google Patents English translation of CN10322392A.
Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.
"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19th Annual Electric Power Conference and Exhibition, Apr. 13, 2017, Chicago, Illinois.
Office Action issued in U.S. Appl. No. 14/829,905 on Nov. 16, 2015.
Office Action issued in U.S. Appl. No. 14/829,905 on Feb. 29, 2016.
Office Action issued in U.S. Appl. No. 14/829,909 on Apr. 15, 2016.
Office Action issued in U.S. Appl. No. 14/829,909 on Dec. 14, 2016.
Office Action issued in U.S. Appl. No. 14/829,909 on Feb. 14, 2017.
International Search Report issued for International Application No. PCT/CN2013/074657, Dec. 26, 2013.
International Search Report issued for International Application No. PCT/CN2014/087887, Jan. 14, 2015.
Supplementary European Search Report issued in European Application No. 13882863.7, Mar. 11, 2016.
Office Action issued by the Japanese Intellectual Property Office in Japanese Application No. 2017-123088, on Apr. 16, 2018.

* cited by examiner

DEVICE AND METHOD FOR CONTROLLING AMMONIA ESCAPE IN AMMONIA-BASED DECARBONIZATION SYSTEM

TECHNICAL FIELD

The present invention belongs to the technical field of environmental protection, and in particular relates to a device and a method for controlling ammonia escape in an ammonia-based desulfurization and decarbonization system.

BACKGROUND

In recent years, the greenhouse effect has gradually become one of the most serious problems faced by human beings. Carbon dioxide is the most important greenhouse gas, and the use of fossil energy is the main source of emission. China's total $CO_2$ emissions have ranked first in the world. Moreover, the situation that China's energy structure dominated by coal will continue for a period of time, and therefore energy from coal will still be the basis for new energy peaking and energy security. China has promised the world to reach its carbon peak in 2030 and achieve carbon neutrality in 2060. The capture, storage and resource utilization of $CO_2$ in exhaust flue gas is of great significance for controlling and reducing greenhouse gas emissions, and for dealing with the greenhouse effect and global warming.

At present, amine-based method is the most widely used carbon capture technology in the world. However, this method has problems of high operating costs, large amount of waste discharge, and the like. At home and abroad, new decarbonization technologies have been actively explored. Compared with the amine method, the ammonia method has the advantages of easy regeneration, low operating costs, and the by-product of decarbonization being an important ammonium bicarbonate fertilizer. Ammonium bicarbonate is a typical compound fertilizer, which can provide nitrogen nutrient and $CO_2$ to plants at the same time. It is especially suitable for modern agriculture with soilless cultivation and greenhouse plant growth. It can provide resource utilization of $CO_2$, achieve carbon cycling, and avoid secondary pollution and $CO_2$ environmental accidents that may be caused by underground carbon storage. Compared with amine-based decarbonization, ammonia has high $CO_2$ absorption efficiency and ammonium bicarbonate is easier to regenerate, which can reduce the cost of decarbonization.

Ammonia-based decarbonization technology has always been the focus of research, and it is a good way to manage greenhouse gases; however, ammonia is volatile, and decarbonization needs to be carried out under alkaline conditions, resulting in an increase in ammonia escape. If this problem is not solved, a large amount of ammonia will escape, which will not only increase the cost of decarbonization, but also cause secondary pollution.

Patent CN113262625A proposes an integrated device for desulfurization and decarbonization, which uses desulfurization circulating liquid for washing to reduce part of the free ammonia in the process gas, and the washing liquid returns to the desulfurization tower to be used as an absorbent for desulfurization. Simply scrubbing the process gas using the desulfurization circulating liquid results in a large amount of ammonia escape. Washing with process water after scrubbing with the desulfurization circulating liquid will generate large amount of ammonia-containing solution. If the ammonia-containing solution returns to the desulfurization functional zone to be used as an absorbent for desulfurization, it may upset the water balance of the desulfurization system and generate wastewater.

Patent CN101600489B proposes an acid washing method to wash the ammonia using $SO_2$ from flue gas, where the process gas is cooled by using a cooling liquid, and sulfur dioxide in the process gas is absorbed into the cooling liquid, thereby obtaining a cooling liquid comprising sulfate. Ammonia is removed from the process gas that has been treated in the $CO_2$ absorber by contacting the process gas comprising ammonia with the cooling liquid containing sulfate. After the cooling liquid absorbs sulfur dioxide, sulfite is generated as the main product. In order to achieve the ammonia removal efficiency desired, sulfuric acid is added to the cooling liquid to control the pH value of the cooling liquid, making the process control of the unit difficult. Moreover, the material balance of the desulfurization and decarbonization system is not considered from an overall system perspective, and sulfur dioxide is partially removed in order to obtain sulfate.

It would be desirable therefore to provide a device and method for controlling ammonia escape in an ammonia-based decarbonization system, where ammonia is used as the desulfurization and decarbonization agent, the gas first enters the desulfurization device for desulfurization, and the desulfurized gas enters the decarbonization device to remove carbon dioxide in the gas. The free ammonia contained in the decarbonized gas is absorbed with the acidic ammonium sulfate solution and acidic water washing liquid of ammonia-based desulfurization.

It also would be desirable therefore to control ammonia escape in the ammonia-based decarbonization system, and at the same time, use the ammonia recovered by washing for desulfurization, which saves ammonia consumption.

DETAILED DESCRIPTION

Figure 1:
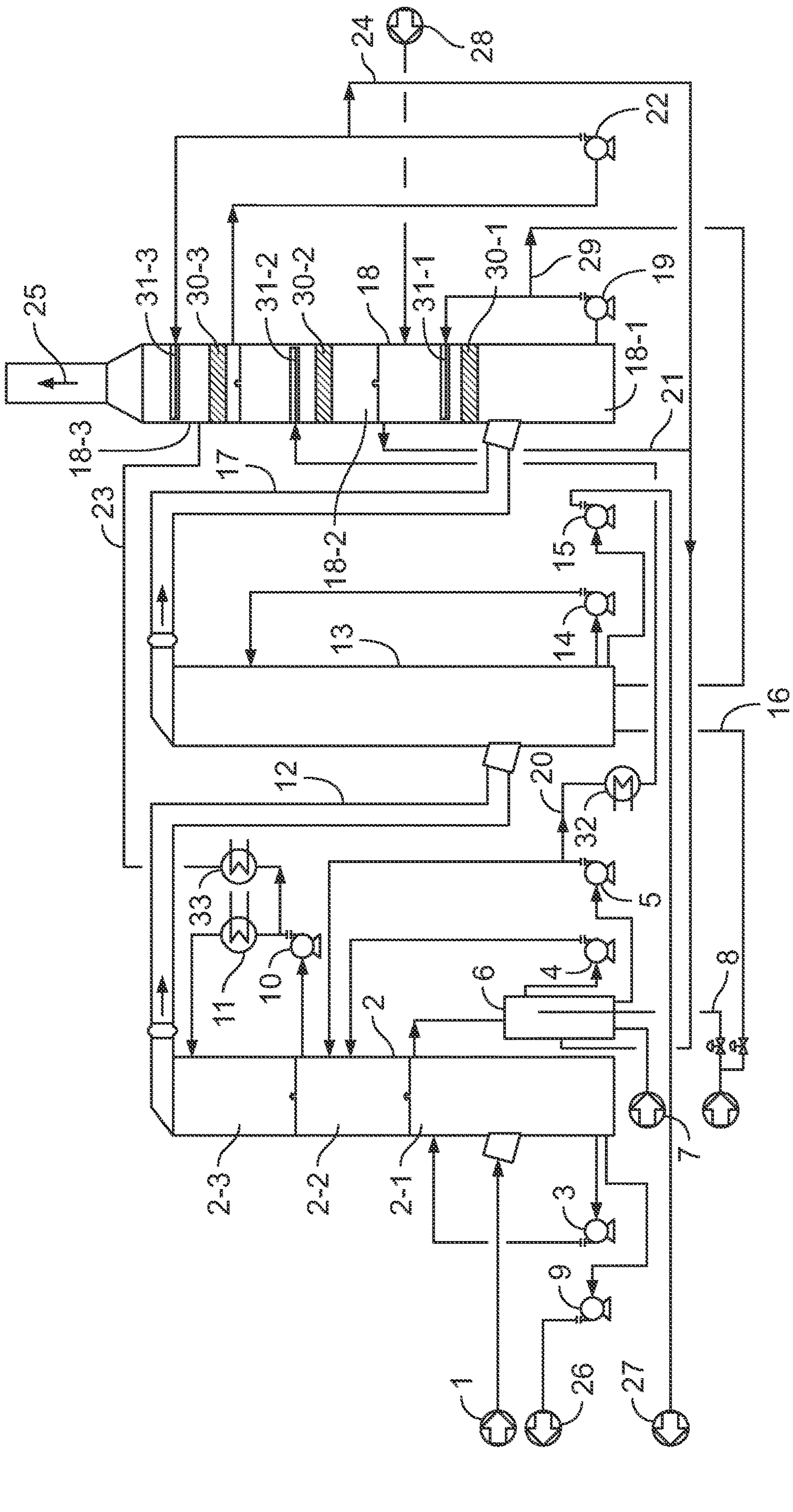
FIG. 1 shows a first embodiment.

Apparatus and methods for controlling ammonia escape in an ammonia-based decarbonization system are provided.

The methods may include receiving gas from an ammonia-based decarbonization process, the gas including free ammonia. The methods may include receiving from an ammonia-based desulfurization process acidic ammonium sulfate solution. The methods may include receiving from an ammonia-based desulfurization process acidic water washing liquid. The methods may include absorbing free ammonia from the gas by washing the gas with the acidic ammonium sulfate solution. The methods may include absorbing free ammonia from the gas by washing the gas with the acidic water washing liquid.

The absorbing may be a first absorbing. The methods may include a second absorbing free ammonia from the gas. The second absorbing may be performed prior to the first absorbing. The second absorbing may include washing the gas with a process water that includes desalinated water, washing condensate water, and acidic water washing liquid drainage.

The methods may include, in the washing, using at least one layer of liquid distributor, causing contact between the acidic ammonium sulfate solution and the gas. The methods may include recovering the acidic ammonium sulfate solution after contact between the acidic ammonium sulfate solution and the gas. The methods may include returning recovered acidic ammonium sulfate solution to the desulfurization process. The methods may include, in the washing, using at least one layer of liquid distributor, causing contact between the acidic water washing liquid and the gas. The methods may include recovering the acidic water washing liquid after contact between the acidic water washing liquid and the gas. The methods may include conveying recovered acidic water washing liquid to the desulfurization process.

The methods may include, in the washing, using at least one layer of liquid distributor, causing contact between the acidic ammonium sulfate solution and the gas. The methods may include recovering the acidic ammonium sulfate solution after contact between the acidic ammonium sulfate solution and the gas. The methods may include returning recovered acidic ammonium sulfate solution to the desulfurization process. The methods may include, in the washing, using at least one layer of liquid distributor, causing contact between the acidic water washing liquid and the gas. The methods may include recovering the acidic water washing liquid after contact between the acidic water washing liquid and the gas. The methods may include conveying recovered acidic water washing liquid to the decarbonization system.

The methods may include, in the second absorbing using at least one layer of liquid distributor to wash the gas with the process water. The methods may include, in the second absorbing ammonia-containing solution produced returns to the desulfurization process.

The methods may include providing at least one layer of liquid distributor for the washing with the process water, the washing with the process water producing an ammonia-containing solution. The methods may include conveying the ammonia-containing solution to the decarbonization system.

The methods may include providing, between washing with the acidic ammonium sulfate solution and washing with the acidic water washing liquid, equipment that allows only gases to pass.

The methods may include providing, between washing with the acidic ammonium sulfate solution and washing with the acidic water washing liquid, components that allow only gases to pass.

The methods may include providing, between washing with the acidic ammonium sulfate solution and washing with the process water, equipment that allows only gases to pass.

The methods may include providing, between washing with the acidic ammonium sulfate solution and washing with the process water, components that allow only gases to pass.

The ammonia-based decarbonization process may include multi-stage absorption that includes a final stage; and less ammonia than the prior stage is added in the final stage and reduces $NH_3$ escape to 200-2000 ppm after decarbonization.

The gas, after being treated in an absorption circulating section of an ammonia-based decarbonization zone, may have an $NH_3$ content in the range 200 to 2000 ppm. The gas, after being treated in an ammonia escape control zone, may have an $NH_3$ content in the range 0 to 30 ppm.

The acidic ammonium sulfate solution may have a pH in the range 4.5-6.5. The acidic ammonium sulfate solution may have an ammonium sulfate concentration in the range 10-38 wt % (weight-percent). The acidic water washing liquid may have a pH in the range 3-7. The acidic water washing liquid may have an ammonium sulfate concentration of in the range 0-5 wt %.

The acidic ammonium sulfate solution and the acidic water washing liquid may have a temperature in the range 20-60° C., and cooling the acidic ammonium sulfate solution and the acidic water washing liquid by a cooler before the washing.

A liquid-gas ratio of the washing with the process water may be in the range 5-25. A liquid-gas ratio of the washing with the acidic ammonium sulfate solution may be in the range 1-20. A liquid-gas ratio of the washing with the acidic water washing liquid may be in the range 1-15.

The methods may include providing a first gas-liquid contact component for washing with the acidic ammonium sulfate solution. The methods may include providing a second gas-liquid contact component for washing with the acidic water washing liquid washer.

One or more of the process water, the washing condensate water, and the acidic water washing liquid drainage may have a pH that is not greater than 8.

The methods may include adding acid added to the process water, the washing condensate water, and the acidic water washing liquid drainage to adjust pH.

The apparatus may include a device for controlling ammonia escape in an ammonia-based desulfurization and decarbonization system.

The device may include an ammonia-based desulfurization zone. The device may include an ammonia-based decarbonization zone. The device may include an ammonia escape control zone.

The ammonia-based desulfurization zone may include a washing cooling section. The ammonia-based desulfurization zone may include an absorption circulating section. The ammonia-based desulfurization zone may include a particle control section.

The ammonia-based decarbonization zone may include a cooling section. The ammonia-based decarbonization zone may include an absorption circulating section.

The ammonia escape control zone may include an ammonia escape control section. The ammonia escape control section may include an acidic ammonium sulfate solution washing system. The ammonia escape control section may include an acidic water washing system.

The absorption circulating section of the ammonia-based desulfurization zone may be connected to the acidic ammonium sulfate solution washing system of the ammonia escape control zone through pipes. The particle control section of the ammonia-based desulfurization zone may connected to the acidic water washing system of the ammonia escape control zone through pipes.

The absorption circulating section of the ammonia-based decarbonization zone may include multi-stage absorption that includes a final stage. The final stage may be configured to add less ammonia than is added in the prior stage.

The final stage may be configured to reduce $NH_3$ escape to 200-2000 ppm after decarbonization.

The ammonia escape control zone may include a process water washing system. The process water washing system may be connected to a process water pipe through pipes. The process water washing system may be connected to the absorption circulating section of an ammonia-based desulfurization device.

The ammonia escape control zone may include a process water washing system. The process water washing system may be connected to a process water pipe through pipes. The process water washing system may be connected to the absorption circulating section of an ammonia-based decarbonization device.

The device may include one or more towers. The device may include equipment configured to allow passage of gases only.

Sections of the ammonia-based desulfurization zone and the ammonia-based decarbonization zone may be configured to be combined into the one or more towers. The equipment may be provided between the sections.

The particle control section of the ammonia-based desulfurization zone may be configured to provide cooling that is performed by the cooling section of the ammonia-based decarbonization zone.

The device may include The device may include an ammonia-based desulfurization zone. The device may include an ammonia-based decarbonization zone. The device may include an ammonia escape control zone.

The ammonia-based desulfurization zone may include. The ammonia-based desulfurization zone may include a washing cooling section. The ammonia-based desulfurization zone may include an absorption circulating section. The ammonia-based desulfurization zone may include a particle control section.

The ammonia-based decarbonization zone may include a cooling section. The ammonia-based decarbonization zone may include an absorption circulating section.

The ammonia escape control zone may include an ammonia escape control section. The ammonia escape control section may include an acidic ammonium sulfate solution washing system. The ammonia escape control section may include an acidic water washing system.

The absorption circulating section of the ammonia-based desulfurization zone may be connected to the acidic ammonium sulfate solution washing system of the ammonia escape control zone through pipes.

The cooling section of the ammonia-based decarbonization zone may be connected to the acidic water washing system of the ammonia escape control zone through pipes.

The absorption circulating section of the ammonia-based decarbonization zone may include multi-stage absorption that includes a final stage. The final stage may be configured to add less ammonia than is added in the prior stage. The final stage may be configured to reduce $NH_3$ escape to 200-2000 ppm after decarbonization.

The ammonia escape control zone may include a process water washing system. The process water washing system may be connected to a process water pipe through pipes. The process water washing system may be connected to the absorption circulating section of the ammonia-based desulfurization zone.

The ammonia escape control zone may include a process water washing system. The process water washing system may be connected to a process water pipe through pipes. The process water washing system may be connected to the absorption circulating section of the ammonia-based decarbonization device.

The device may include one or more towers. The device may include equipment configured to allow passage of gases only.

Sections of the ammonia-based desulfurization zone and the ammonia-based decarbonization zone may be configured to be combined into the one or more towers. The equipment may be provided between the sections.

The particle control section of the ammonia-based desulfurization zone may be configured to provide cooling that is performed by the cooling section of the ammonia-based decarbonization zone.

The apparatus and methods may include controlling ammonia escape in an ammonia-based decarbonization system, where ammonia may be used to remove sulfur oxides and $CO_2$ to generate ammonium sulfate fertilizer and ammonium bicarbonate fertilizer. The ammonia-based desulfurization and decarbonization device may be provided with an ammonia-based desulfurization functional zone, an ammonia-based decarbonization functional zone, and an ammonia escape control functional zone. The ammonia-based desulfurization functional zone may include a washing cooling section, an absorption circulating section, and a particle control section. The ammonia-based decarbonization functional zone may include a cooling section, and an absorption circulating section. The ammonia escape control functional zone may include an acidic ammonium sulfate solution washing system and an acidic water washing system. The absorption circulating section of the ammonia-based desulfurization functional zone may be connected to the acidic ammonium sulfate solution washing system of the ammonia escape control functional zone through pipes, and the particle control section of the ammonia-based desulfurization functional zone or the cooling section of the ammonia-based decarbonization functional zone may be connected to the acidic water washing system of the ammonia escape control functional zone through pipes. The ammonia-based decarbonization absorption circulating section may include multistage absorption in which a little or no ammonia is added in the final stage so as to reduce $NH_3$ escape after decarbonization.

Ammonia may be used as the desulfurization and decarbonization agent. The gas may first enter the desulfurization functional zone for desulfurization to generate ammonium sulfate fertilizer. The desulfurized gas may enter the decarbonization functional zone to remove carbon dioxide in the gas and generate ammonium bicarbonate fertilizer. The decarbonized gas may contain free ammonia, and it may be washed with the acidic ammonium sulfate solution and acidic water washing liquid of ammonia-based desulfurization to absorb the free ammonia in the gas. The acidic ammonium sulfate solution may include the solution of the absorption circulating section of the ammonia-based desulfurization functional zone, its ammonium sulfate concentration may be in the range 10-38 wt %, and its pH may be in the range 4.5-6.5; the acidic water washing liquid may include the solution of the particle control section of the ammonia-based desulfurization functional zone or the solution of the cooling section of the ammonia-based decarbonization functional zone, its ammonium sulfate concentration may be in the range 0-5 wt %, and its pH may be in the range 3-7. After washing in the ammonia escape control functional zone, the concentrations of the acidic ammonium sulfate solution and the acidic water washing liquid may be basically unchanged, the pH of the acidic ammonium sulfate solution may be in the range 4.6-6.9, and the pH of the acidic water washing liquid may be in the range 3.5-7.5.

The temperature of the acidic ammonium sulfate solution and the acidic water washing liquid may be in the range 20-60° C., preferably 30-50° C.

Prior to washing, the acidic ammonium sulfate solution and the acidic water washing liquid may be cooled by a cooler before washing, and then washed.

Liquid distributors and gas-liquid contact parts may be provided inside the acidic ammonium sulfate solution and acidic water washing liquid washers. The liquid distributor may include a trough distributor, and the gas-liquid contact parts may include packing.

Before using the acidic ammonium sulfate solution and acidic water washing liquid of ammonia-based desulfurization to absorb free ammonia in the gas, may be included a washing of the gas with process water to absorb free ammonia. The process water may include desalted water, or the solution in the cooling section of the ammonia-based decarbonization functional zone, or the drainage of the acidic water washing system of the ammonia escape control functional zone.

At least one layer of liquid distributor may be provided for washing with the acidic ammonium sulfate solution of ammonia-based desulfurization, and the solution after gas-liquid contact washing may be recovered and returns to the desulfurization system.

At least one layer of liquid distributor may be provided for washing with the acidic water washing liquid of ammonia-based desulfurization, and the solution after gas-liquid contact washing may be recovered and returns to the desulfurization system or the decarbonization system.

At least one layer of liquid distributor may be provided for washing with the process water, and the ammonia-containing solution produced may be returned to the desulfurization system or the decarbonization system.

Between washing with the acidic ammonium sulfate solution and acidic water washing liquid of ammonia-based desulfurization, a liquid collector that only allows gases to pass through may be provided.

Between washing with the acidic ammonium sulfate solution of ammonia-based desulfurization and washing with the process water, a liquid collector that only allows gases to pass through may be provided.

The above functional zones may be combined into one tower or multiple towers. In the desulfurization functional zone, each section may be provided with at least one spray layer, and equipment/components that allow gases to pass through may be provided between sections. The particle removal section may be divided into two parts. The spray washing in the first part may include circulating washing with a high-concentration solution containing ammonium sulfate, and the second part may include circulating washing with a dilute solution containing ammonium sulfate. Between the two parts there may be equipment/components that allows gases to pass through. In the decarbonization functional zone, each section may be provided with at least one spray layer, and equipment/components that allow gases to pass through may be provided between the sections.

The gas after ammonia-based decarbonization may include free ammonia. The apparatus and methods may include the use of acidic ammonium sulfate solution and acidic water washing liquid of ammonia-based desulfurization to wash the gas after ammonia-based decarbonization to absorb free ammonia therein. The apparatus and methods may include washing with process water to absorb free ammonia before using the acidic ammonium sulfate solution and acidic water washing liquid of ammonia-based desulfurization to absorb the free ammonia in the gas. The process water may include desalted water and washing condensate water.

In the apparatus and methods, the flow rate of the acidic ammonium sulfate solution, acidic water washing liquid or process water used for washing and absorption may be adjusted as required, and the liquid-to-gas ratio of the process water may be in the range 5-25, the range 10-20, or the range 12-18; the liquid-gas ratio for the acidic ammonium sulfate solution may be in the range 1-20, the range 1-10, or the range 2-6; and the liquid-gas ratio for the acidic water washing liquid may be in the range 1-20, the range 1-15, or the range 2-10.

$$\text{Liquid-gas ratio}=Q/V,$$

wherein Q is liquid circulation rate, L/h, and V is process gas flow after ammonia-based decarbonization (gas flow under working conditions, i.e., operating conditions (temperature, pressure, etc.)), $m^3/h$.

The apparatus and methods may mainly remove the free ammonia contained in the gas after ammonia-based decarbonization, and may have little influence on the $SO_2$ content and the $CO_2$ content.

For the acidic ammonium sulfate solution, the pH may be in the range 4.5-6.5, and the ammonium sulfate concentration may be in the range 10-38 wt %, the range 12-35 wt %, the range 15-30 wt % or the range 17-28 wt %; for the acidic water washing liquid, the pH may be in the range 3-7, the ammonium sulfate concentration may be in the range 0-5 wt %, the range 0-3 wt %, the range 0-1 wt %, or the range 0-0.6 wt %.

In the method of the present invention, the temperature of the acidic ammonium sulfate solution and the acidic water washing liquid may be in the range 20-60° C. or the range 30-50° C.

The $NH_3$ content in the gas after being treated by the decarbonization absorption tower may be in the range 200 to 2000 ppm, the range 400 to 1500 ppm, or the range 500 to 1000 ppm.

The $SO_2$ content in the gas after being treated by the decarbonization absorption tower may be in the range 0 to 20 $mg/Nm^3$, the range 0 to 15 $mg/Nm^3$, or the range 0 to 10 $mg/Nm^3$.

The $CO_2$ content in the gas after being treated by the decarbonization absorption tower may be in the range 0-20v % (volume-percent), the range 1-10v %, or the range 2-7v %.

The $NH_3$ content in the gas after being treated may be in the range 0 to 30 ppm, the range 0 to 20 ppm, or the range 0 to 10 ppm.

The apparatus and methods may provide beneficial economic effects in addition to technical effects, e.g., reducing ammonia escape, reducing ammonia consumption, reducing ammonia consumption loss by 96%-99% or 97%-99%, as shown in the Examples below.

In the present invention, the $SO_2$ content in the gas may be determined according to HJ 629-2011 Fixed Pollution Source Waste Gas-Determination of Sulfur Dioxide-Non-dispersive Infrared Absorption Method; the $CO_2$ content may be determined according to HJ 870-2017 Fixed Pollution Source Waste Gas-Determination of Carbon Dioxide-Non-dispersive Infrared Absorption Method; and the $NH_3$ content may be determined according to HJ 533-2009 Ambient Air and Waste Gas-Determination of Ammonia-Nessler's Reagent Spectrophotometry.

All concentrations mentioned in the present invention are by weight unless otherwise stated.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

FIG. 1 shows illustrative example 1, where before using the acidic ammonium sulfate solution and acidic water washing liquid of ammonia-based desulfurization to absorb free ammonia in the gas, the gas was washed with the process water to absorb free ammonia.

Figure 2:
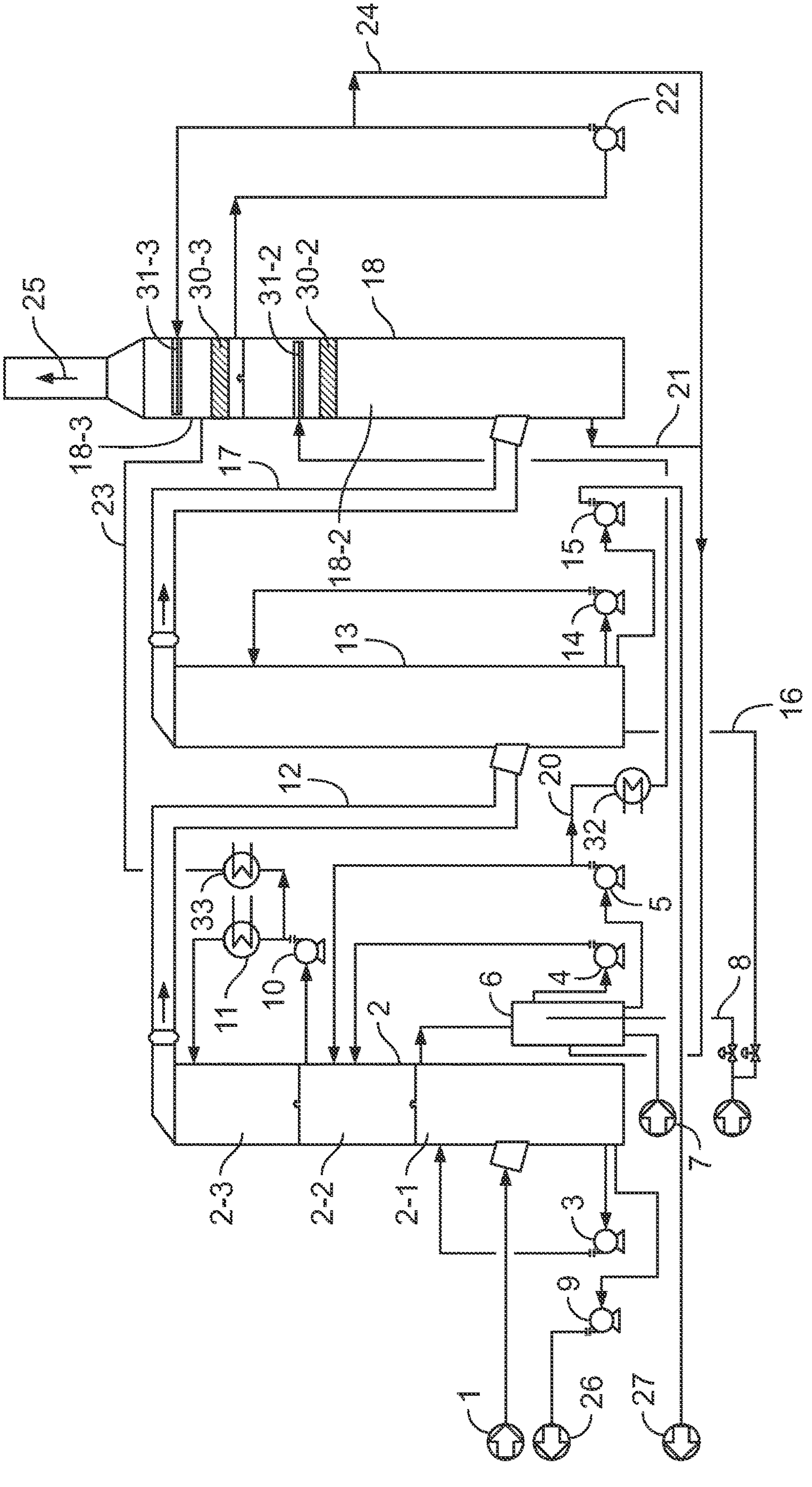
FIG. 2 shows a second embodiment.

FIG. 2 shows illustrative example 2, where the acidic ammonium sulfate solution and acidic water washing liquid of ammonia-based desulfurization were used to wash the gas to absorb free ammonia therein.

Figure 3:
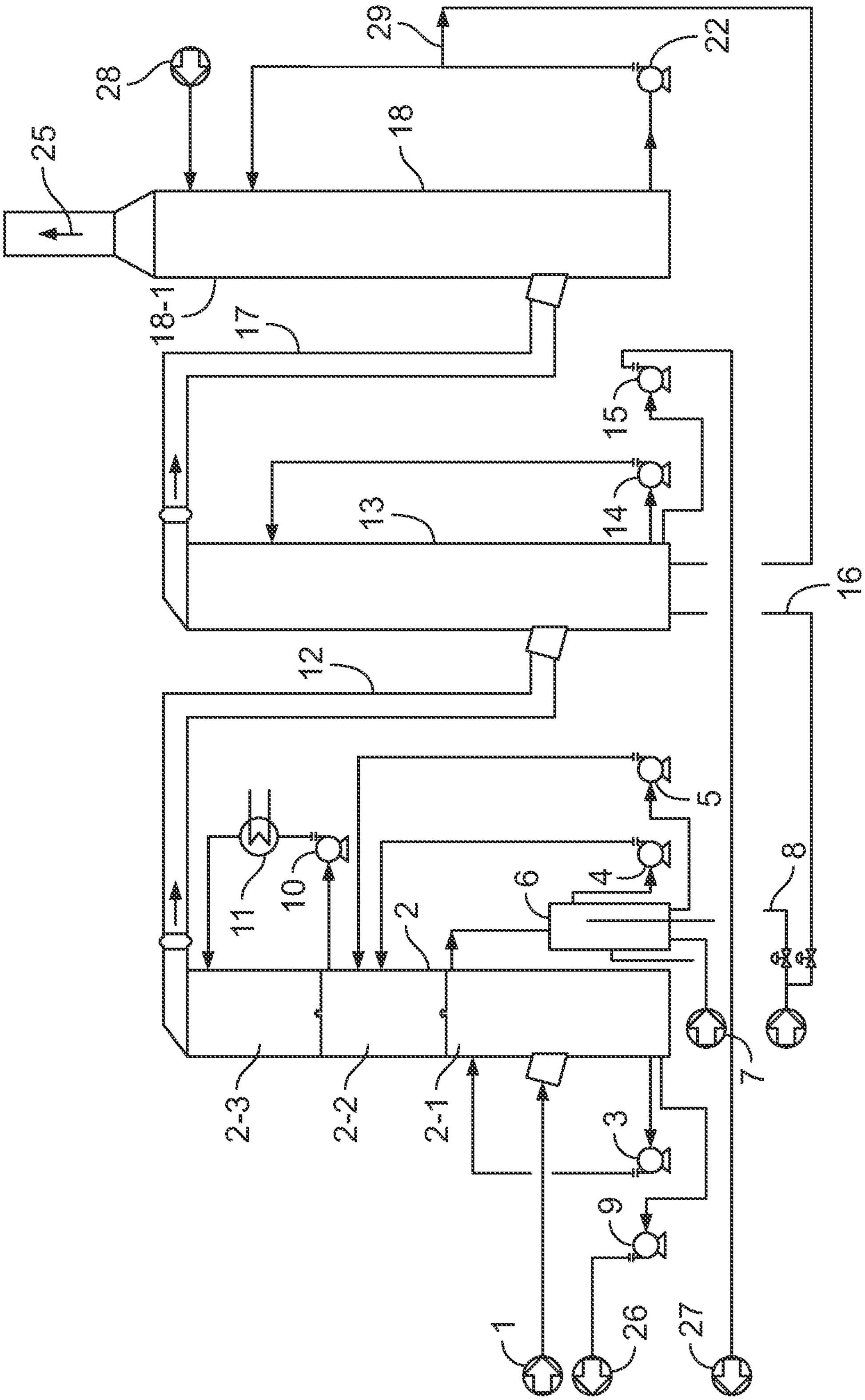
FIG. 3 shows a comparative embodiment.

FIG. 3 shows an illustrative comparative example, where the gas was washed with the process water to absorb free ammonia.

Process gas 1, desulfurization functional zone 2, desulfurization washing cooling section 2-1, desulfurization absorption circulating section 2-2, desulfurization particle control section 2-3, desulfurization circulating pump a 3, desulfurization circulating pump b 4, desulfurization circulating pump c 5, desulfurization circulating tank 6, oxidizing air 7, addition of ammonia to desulfurization system 8, ammonium sulfate discharge pump 9, desulfurization circulating pump d 10, desulfurization heat exchanger 11, desulfurized tail gas 12, decarbonization absorption tower 13, decarbonization circulating pump 14, ammonium bicarbonate discharge pump 15, addition of ammonia to decarbonization system 16, decarbonized tail gas 17, ammonia washing tower 18, process water washing section 18-1, ammonium sulfate washing section 18-2, acidic liquid washing section 18-3, ammonia washing circulating pump a 19, desulfurization absorption section ammonium sulfate solution 20, return desulfurization liquid 21, ammonia washing circulating pump b 22, desulfurization particle control section solution 23, return acidic solution 24, clean flue gas 25, finished product ammonium sulfate 26, finished product ammonium bicarbonate 27, process water 28, ammonia-containing solution 29, process water washing section packing ammonium sulfate washing section packing 30-2, acidic liquid washing section packing 30-3, process water washing section trough distributor 31-1, ammonium sulfate washing section trough distributor 31-2, acidic liquid washing section trough distributor 31-3, desulfurization absorption section ammonium sulfate solution heat exchanger to ammonia washing 32, and desulfurization particle control section solution heat exchanger to ammonia washing 33.

Illustrative Example 1

As shown in FIG. 1, the process gas 1 containing sulfur oxides and $CO_2$ entered the desulfurization functional zone 2, and passed through the desulfurization washing cooling section 2-1, the desulfurization absorption circulating section 2-2, and the desulfurization particle control section 2-3 successively. In the desulfurization washing cooling section 2-1, spray circulation was conducted using the desulfurization circulating pump-a 3, the ammonium sulfate solution was concentrated while the tail gas was cooled, and the concentrated ammonium sulfate slurry from which solid was precipitated was sent to the ammonium sulfate production 26 through the ammonium sulfate discharge pump 9. Absorption spray circulation was carried out using the desulfurization circulating pump-b 4, the desulfurization circulating pump-c 5, and the desulfurization circulating tank 6 to absorb sulfur oxides (sulfur dioxide and sulfur trioxide) in the tail gas. The desulfurization circulating pump-c 5 sent a part of the ammonium sulfate solution 20 to the ammonium sulfate washing section 18-2 of the ammonia washing tower after being cooled to 35° C. by the cooler 32, and the washed solution 21 was returned to the desulfurization circulating tank 6. Washing spray circulation was carried out using the desulfurization circulating pump-d 10, and the washing temperature and the temperature of the tail gas 12 after desulfurization were controlled using the desulfurization heat exchanger 11. The particle control section 2-3 of the ammonia-based desulfurization functional zone performed the cooling function of the ammonia-based decarbonization. The acidic solution 23 condensed from the flue gas was cooled to 35° C. by the cooler 33 and was then used as the replenishing water for the acidic water washing section 18-3 of the ammonia washing tower, and the washed solution 24 was returned to the desulfurization circulating tank 6. It went to desulfurization system 8 for addition of ammonia, and after metering, then to the desulfurization circulating tank 6 for addition of ammonia. The oxidizing air 7 went to the desulfurization circulating tank 6 to oxidize the solution.

The desulfurized tail gas 12 entered the decarbonization absorption tower 13, absorption circulation was carried out using the decarbonization circulating pump 14, and the finished product ammonium carbonate 27 was sent out using the ammonium bicarbonate discharge pump 15. It was sent to decarbonization system 16 for addition of ammonia, and after metering, to the decarbonization absorption tower 13 for addition of ammonia.

The decarbonized tail gas 17 entered the ammonia washing tower 18, and passed through the process water washing section 18-1, the ammonium sulfate washing section 18-2, and the acidic liquid washing section 18-3 successively. In the process water washing section 18-1 of the ammonia washing tower, process water washing was carried out using the ammonia washing circulating pump-a 19, the process water washing section 18-1 of the ammonia washing tower was provided with the trough distributor 31-1 and the packing 30-1, the process water was replenished through the external process water pipe 28, and the ammonia-containing solution 29 after washing was sent to the decarbonization tower 13. A part of the ammonium sulfate solution 20 in the desulfurization absorption section sent out by the desulfurization circulating pump-c 5 entered the ammonium sulfate washing section 18-2 of the ammonia washing tower, the ammonium sulfate washing section 18-2 of the ammonia washing tower was provided with the trough distributor 31-2 and the packing 30-2, and the washed solution (that is, the return desulfurization solution) 21 was returned to the desulfurization circulating tank 6. The acidic solution condensed from the flue gas sent out by the desulfurization circulating pump-d 10 (i.e., the solution in the desulfurization particle control section) 23 was used as replenishing water for the acidic water washing section 18-3 of the ammonia washing tower, the acidic water washing section 18-3 of the ammonia washing tower was provided with the trough distributor 31-3 and the packing 30-3, and the washed solution (that is, the return acidic solution) 24 was returned to the desulfurization circulating tank 6. After washing, the clean flue gas 25 was discharged.

The acidic ammonium sulfate solution 20 had a flow rate of 350 $m^3/h$, a pH of 6.4, and an ammonium sulfate concentration of 18 wt %. The acidic ammonium sulfate solution returned after entering the ammonia washing tower had a pH of 6.9, and its ammonium sulfate concentration remained basically unchanged.

The flow rate of the acidic water washing liquid 23 was adjusted according to the pH value of the water washing liquid in the acidic water washing section 18-3 of the ammonia washing tower, its pH was 3.8, and its ammonium sulfate concentration was 2 wt %. The acidic water washing liquid returned after entering the ammonia washing tower had a pH of 4.2, and its ammonium sulfate concentration remained basically unchanged. The circulation rate of the ammonia washing circulating pump b 22 was 500 $m^3/h$ to ensure the ammonia washing effect.

The flow rate of the process water 28 was adjusted according to the pH value of the water washing liquid in the process water washing section 18-1 of the ammonia washing tower, and the circulation rate of the ammonia washing circulating pump a 19 is 1200 $m^3$/h to ensure the ammonia washing effect. The pH of the desalinated water was chosen to be 6.9, and the pH of the solution returned after entering the ammonia washing tower was 7.9.

99.6% anhydrous ammonia was chosen as the absorbent for desulfurization and decarbonization, and the parameters of the process gas 1 are shown in the table below:

| No. | Item | Value |
|---|---|---|
| 1 | Gas flow, $Nm^3$/h | 82381 |
| 2 | Temperature, ° C. | 120 |
| 3 | $SO_2$ content, mg/$Nm^3$ | 4480 |
| 4 | $CO_2$ content, v % | 12.9 |
| 5 | $H_2O$ content, v % | 8 |
| 6 | $O_2$ content, v % | 5.61 |

The parameters of the gas 12 after desulfurization and cooling are shown in the table below:

| No. | Item | Value |
|---|---|---|
| 1 | Gas flow, $Nm^3$/h | 78710 |
| 2 | Temperature, ° C. | 18 |
| 3 | $SO_2$ content, mg/$Nm^3$ | 35 |
| 4 | $CO_2$ content, v % | 13.5 |
| 5 | $NH_3$ content, ppm | 3 |
| 6 | Desulfurization efficiency, % | 99 |
| 7 | Amount of by-product ammonium sulfate, t/h | 0.76 |
| 8 | 99.6% anhydrous ammonia consumption, t/h | 0.16 |

The main parameters of the gas 17 treated by the decarbonization absorption tower are shown in the following table:

| No. | Item | Value |
|---|---|---|
| 1 | Gas flow at the outlet of decarbonization absorption tower, $Nm^3$/h | 75333 |
| 2 | $CO_2$ content at the outlet of decarbonization absorption tower, v % | 5.26 |
| 3 | $NH_3$ content at the outlet of decarbonization absorption tower, v % | 1000 |
| 4 | $SO_2$ content at the outlet of decarbonization absorption tower, mg/$Nm^3$ | 5 |
| 5 | Decarbonization efficiency, % | 60 |
| 6 | Amount of by-product ammonium bicarbonate, t/h | 22.5 |
| 7 | 99.6% anhydrous ammonia consumption, t/h | 4.86 |

The main parameters of the gas 25 after being treated by the ammonia washing tower are shown in the table below:

| No. | Item | Value |
|---|---|---|
| 1 | Gas flow at the outlet of ammonia washing tower, $Nm^3$/h | 77754 |
| 2 | $CO_2$ content at the outlet of ammonia washing tower, v % | 5.26 |
| 3 | $NH_3$ content at the outlet of ammonia washing tower, ppm | 10 |
| 4 | $SO_2$ content at the outlet of ammonia washing tower, mg/$Nm^3$ | 5 |

The ammonia escape amount is 4.98 t/year, and the ammonia consumption loss is about yuan/year.

Illustrative Example 2

As shown in FIG. 2, illustrative example 2 is the same as illustrative example 1, except that the process water washing section 18-1 of the ammonia washing tower was not provided. The parameters of desulfurization and decarbonization were the same, and the main parameters of the gas 25 after treatment in the ammonia washing tower are shown in the table below:

| No. | Item | Value |
|---|---|---|
| 1 | Gas flow at the outlet of ammonia washing tower, $Nm^3$/h | 77754 |
| 2 | $CO_2$ content at the outlet of ammonia washing tower, v % | 5.26 |
| 3 | $NH_3$ content at the outlet of ammonia washing tower, ppm | 18 |
| 4 | $SO_2$ content at the outlet of ammonia washing tower, mg/$Nm^3$ | 5 |

The ammonia escape amount is 8.96 t/year, and the ammonia consumption loss is about 36,000 yuan/year.

ILLUSTRATIVE COMPARATIVE EXAMPLE

As shown in FIG. 3, the illustrative comparative examples is the same as illustrative example 1, except that the ammonium sulfate washing section 18-2 and the acidic solution water washing section 18-3 of the ammonia washing tower were not provided. The parameters of desulfurization and decarbonization were the same, and the main parameters of the gas 25 after treatment in the ammonia washing tower are shown in the table below:

| No. | Item | Value |
|---|---|---|
| 1 | Gas flow at the outlet of ammonia washing tower, $Nm^3$/h | 77754 |
| 2 | $CO_2$ content at the outlet of ammonia washing tower, v % | 5.26 |
| 3 | $NH_3$ content at the outlet of ammonia washing tower, ppm | 500 |
| 4 | $SO_2$ content at the outlet of ammonia washing tower, mg/$Nm^3$ | 5 |

The ammonia escape amount is 248 t/year, and the ammonia consumption loss is about 99,2000 yuan/year.

It can be seen from the comparison between the above illustrative examples and the illustrative comparative example that ammonia escape amount in the gas treated by the method and device of the present invention is significantly reduced, so that the ammonia consumption loss is greatly reduced.

Illustrative features may include:

1. A method for controlling ammonia escape in an ammonia-based decarbonization system, wherein a gas after ammonia-based decarbonization contains free ammonia, and the gas after ammonia-based decarbonization is washed with the acidic ammonium sulfate solution and acidic water washing liquid of ammonia-based desulfurization to absorb free ammonia therein.

2. The method of aspect 1, wherein before absorbing the free ammonia in the gas with the acidic ammonium sulfate solution and acidic water washing liquid of ammonia-based desulfurization, the method further comprises washing the gas with a process water to absorbs free ammonia, and the process water is preferably desalinated water, washing condensate water, and acidic water washing liquid drainage.

3. The method of aspect 1, wherein the ammonia-containing solution produced by washing with the acidic ammonium sulfate solution and acidic water washing liquid of ammonia-based desulfurization returns to the desulfurization system or the decarbonization system.

4. The method of aspect 1, wherein at least one layer of liquid distributor is provided for washing with the acidic ammonium sulfate solution of ammonia-based desulfurization, and the solution after gas-liquid contact washing is recovered and returns to the desulfurization system.

5. The method of aspect 1, wherein at least one layer of liquid distributor is provided for washing with the acidic water washing liquid of ammonia-based desulfurization, and the solution after gas-liquid contact washing is recovered and returns to the desulfurization system or the decarbonization system.

6. The method of aspect 2, wherein at least one layer of liquid distributor is provided for washing with the process water, and the ammonia-containing solution produced returns to the desulfurization system or the decarbonization system.

7. The method of aspect 1, wherein between washing with the acidic ammonium sulfate solution and acidic water washing liquid of ammonia-based desulfurization, equipment or components that only allow gases to pass through are provided.

8. The method of aspect 2, wherein between washing with the acidic ammonium sulfate solution of ammonia-based desulfurization and washing with the process water, equipment or components that only allow gases to pass through are provided.

9. The method of aspect 1, wherein the ammonia-based decarbonization absorption circulating section includes multi-stage absorption, and a little or no ammonia is added in the final stage to reduce $NH_3$ escape after decarbonization.

10. The method of aspect 1, wherein the $NH_3$ content in the gas after being treated in the absorption circulating section of the ammonia-based decarbonization functional zone is 200 to 2000 ppm; preferably 400 to 1500 ppm; and more preferably 500 to 1000 ppm.

11. The method of aspect 1, wherein the $NH_3$ content in the gas after being treated in the ammonia escape control functional zone is 0 to 30 ppm; preferably 0 to 20 ppm; and more preferably 0 to 10 ppm.

12. The method of aspect 1, wherein the acidic ammonium sulfate solution has a pH of 4.5-6.5, and an ammonium sulfate concentration of 10-38 wt %; and the acidic water washing liquid has a pH of 3-7 and an ammonium sulfate concentration of 0-5 wt %.

13. The method of aspect 1, wherein the temperature of the acidic ammonium sulfate solution and the acidic water washing liquid is 20-60° C., preferably 30-50° C.

14. The method of aspect 1, wherein the acidic ammonium sulfate solution and the acidic water washing liquid are cooled by a cooler before washing, and then washed.

15. The method of aspect 2, wherein the liquid-gas ratio for the process water is generally preferably 10-20, and more preferably 12-18.

16. The method of aspect 1, wherein the liquid-gas ratio for the acidic ammonium sulfate solution is generally 1-20, preferably 1-10, and more preferably 2-6.

17. The method of aspect 1, wherein the liquid-gas ratio for the acidic water washing liquid is generally 1-15, preferably 1-8, and more preferably 2-5.

18. The method of aspect 1, wherein a gas-liquid contact component is provided in the acidic ammonium sulfate solution and acidic water washing liquid washer, and the gas-liquid contact component is preferably packing.

19. The method of aspect 2, wherein the pH of the process water, the washing condensate water, and the acidic water washing liquid drainage is not greater than 8.

20. The method of aspect 2, wherein an acid is added to the process water, the washing condensate water, and the acidic water washing liquid drainage to adjust pH, and preferably the acid is sulfuric acid.

21. A device for controlling ammonia escape in an ammonia-based desulfurization and decarbonization system, wherein the device includes an ammonia-based desulfurization functional zone, an ammonia-based decarbonization functional zone, and an ammonia escape control functional zone, wherein, the ammonia-based desulfurization functional zone includes a washing cooling section, an absorption circulating section, and a particle control section, the ammonia-based decarbonization functional zone includes a cooling section, and an absorption circulating section, the ammonia escape control functional zone includes an ammonia escape control section including an acidic ammonium sulfate solution washing system and an acidic water washing system, the absorption circulating section of the ammonia-based desulfurization functional zone is connected to the acidic ammonium sulfate solution washing system of the ammonia escape control functional zone through pipes, and the particle control section of the ammonia-based desulfurization functional zone or the cooling section of the ammonia-based decarbonization functional zone is connected to the acidic water washing system of the ammonia escape control functional zone through pipes.

22. The device of aspect 21, wherein the ammonia-based decarbonization absorption circulating section includes multi-stage absorption, and a little or no ammonia is added in the final stage to reduce $NH_3$ escape after decarbonization.

23. The device of aspect 21, wherein the ammonia escape control functional zone can also include a process water washing system, the process water washing system is connected to a process water pipe through pipes, and is connected to the absorption circulating section of the ammonia-based desulfurization device or the absorption circulating section of the ammonia-based decarbonization device.

24. The device of aspect 21, wherein the sections of the ammonia-based desulfurization functional zone and the ammonia-based decarbonization functional zone is capable of combining into one tower or multiple towers, and equipments/components allowing gases to pass through are provided between the sections.

25. The device of aspect 21, wherein the particle control section of the ammonia-based desulfurization functional zone can partially or completely realize the function of the cooling section of the ammonia-based decarbonization functional zone.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus and methods for controlling ammonia escape in an ammonia-based decarbonization system have been provided. Persons skilled in the art will appreciate that the present invention may be practiced by other than the described embodiments, which are presented for purposes of illustration rather than of limitation. The present invention is limited only by the claims that follow.

What is claimed is:

1. A device for controlling ammonia escape in an ammonia-based desulfurization and decarbonization system, the device comprises:
- an ammonia-based desulfurization zone;
- an ammonia-based decarbonization zone; and
- an ammonia escape control zone, wherein:
- the ammonia-based desulfurization zone includes:
  - a washing cooling section;
  - an absorption circulating section; and
  - a particle control section;
- the ammonia-based decarbonization zone includes:
  - a cooling section; and
  - an absorption circulating section;
- the ammonia escape control zone includes an ammonia escape control section that includes:
  - an acidic ammonium sulfate solution washing system; and
  - an acidic water washing system;
- the absorption circulating section of the ammonia-based desulfurization zone is connected to the acidic ammonium sulfate solution washing system of the ammonia escape control zone through pipes; and
- the particle control section of the ammonia-based desulfurization zone is connected to the acidic water washing system of the ammonia escape control zone through pipes.

2. The device of claim 1 wherein:
- the absorption circulating section of the ammonia-based decarbonization zone includes multi-stage absorption that includes a final stage; and
- the final stage is configured to:
  - add less ammonia than is added in the prior stage; and
  - reduce $NH_3$ escape to 200-2000 ppm after decarbonization.

3. The device of claim 1 wherein:
- the ammonia escape control zone further includes a process water washing system; and
- the process water washing system is connected:
  - to a process water pipe through pipes; and
  - to the absorption circulating section of an ammonia-based desulfurization device zone.

4. The device of claim 1 wherein:
- the ammonia escape control zone further includes a process water washing system; and
- the process water washing system is connected:
  - to a process water pipe through pipes; and
  - to the absorption circulating section of an ammonia-based decarbonization zone.

5. The device of claim 1 further comprising:
- one or more towers; and
- equipment configured to allow passage of gases only;

wherein:
- the sections of the ammonia-based desulfurization zone and the ammonia-based decarbonization zone are configured to be combined into the one or more towers; and
- the equipment is provided between the sections.

6. A device for controlling ammonia escape in an ammonia-based desulfurization and decarbonization system, the device comprises:
- an ammonia-based desulfurization zone;
- an ammonia-based decarbonization zone; and
- an ammonia escape control zone, wherein:
- the ammonia-based desulfurization zone includes:
  - a washing cooling section;
  - an absorption circulating section; and
  - a particle control section;
- the ammonia-based decarbonization zone includes:
  - a cooling section; and
  - an absorption circulating section;
- the ammonia escape control zone includes an ammonia escape control section that includes:
  - an acidic ammonium sulfate solution washing system; and
  - an acidic water washing system;
- the absorption circulating section of the ammonia-based desulfurization zone is connected to the acidic ammonium sulfate solution washing system of the ammonia escape control zone through pipes; and
- the cooling section of the ammonia-based decarbonization zone is connected to the acidic water washing system of the ammonia escape control zone through pipes.

7. The device of claim 6 wherein:
- the absorption circulating section of the ammonia-based decarbonization zone includes multi-stage absorption that includes a final stage; and
- the final stage is configured to:
  - add less ammonia than is added in the prior stage; and
  - reduce $NH_3$ escape to 200-2000 ppm after decarbonization.

8. The device of claim 6 wherein the ammonia escape control zone further includes a process water washing system that is connected:
- to a process water pipe through pipes; and
- to the absorption circulating section of the ammonia-based desulfurization zone.

9. The device of claim 6 wherein the ammonia escape control zone further includes a process water washing system that is connected:
- to a process water pipe through pipes; and
- to the absorption circulating section of the ammonia-based decarbonization zone.

10. The device of claim 6 further comprising:
- one or more towers; and
- equipment configured to allow passage of gases only;

wherein:
- the sections of the ammonia-based desulfurization zone and the ammonia-based decarbonization zone are configured to be combined into the one or more towers; and
- the equipment is provided between the sections.

* * * * *